United States Patent
Jung (10) Patent No.: US 11,647,149 B2
(45) Date of Patent: May 9, 2023

(54) VIDEO RECORD SYSTEM AND OPERATION METHOD THEREOF

(71) Applicants: HYUNDAI MOTOR COMPANY, Seoul (KR); Kia Corporation, Seoul (KR)

(72) Inventor: Seul A Jung, Hwaseong-si (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 0 days.

(21) Appl. No.: 17/545,268

(22) Filed: Dec. 8, 2021

(65) Prior Publication Data

US 2022/0408053 A1 Dec. 22, 2022

(30) Foreign Application Priority Data

Jun. 22, 2021 (KR) .................. 10-2021-0081145

(51) Int. Cl.
| | |
|---|---|
| *H04N 5/77* | (2006.01) |
| *H04N 7/18* | (2006.01) |
| *G01C 21/36* | (2006.01) |
| *H04N 5/232* | (2006.01) |
| *G01S 19/14* | (2010.01) |
| *H04N 5/907* | (2006.01) |

(52) U.S. Cl.
CPC ............ *H04N 5/77* (2013.01); *G01C 21/3647* (2013.01); *G01S 19/14* (2013.01); *H04N 5/23203* (2013.01); *H04N 5/907* (2013.01); *H04N 7/183* (2013.01)

(58) Field of Classification Search
None
See application file for complete search history.

(56) References Cited

U.S. PATENT DOCUMENTS

| | | | | |
|---|---|---|---|---|
| 2006/0269256 A1* | 11/2006 | Senoo | ............... | G11B 27/3027 386/231 |
| 2012/0002051 A1* | 1/2012 | Nix | ...................... | G06V 20/597 348/148 |
| 2021/0027309 A1* | 1/2021 | Wells | ...................... | G06Q 40/08 |
| 2021/0291853 A1* | 9/2021 | Hamaguchi | ............ | G06V 20/56 |

* cited by examiner

*Primary Examiner* — Eileen M Adams
(74) *Attorney, Agent, or Firm* — Morgan, Lewis & Bockius LLP (57) ABSTRACT

A video record system and an operation method thereof are provided. The video record system includes at least one camera and a controller connected with the at least one camera. The controller records a video around a vehicle using the at least one camera, records location information of the vehicle when recording the video, and provides a list of videos recorded according to a driving situation of the vehicle.

16 Claims, 6 Drawing Sheets

VIDEO RECORD SYSTEM AND OPERATION METHOD THEREOF

CROSS-REFERENCE TO RELATED APPLICATION

This application claims the benefit of priority to Korean Patent Application No. 10-2021-0081145, filed on Jun. 22, 2021 in the Korean Intellectual Property Office, the entire contents of which are incorporated herein by reference.

TECHNICAL FIELD

The present disclosure relates to a video record system and an operation method thereof.

BACKGROUND

Figure 1:
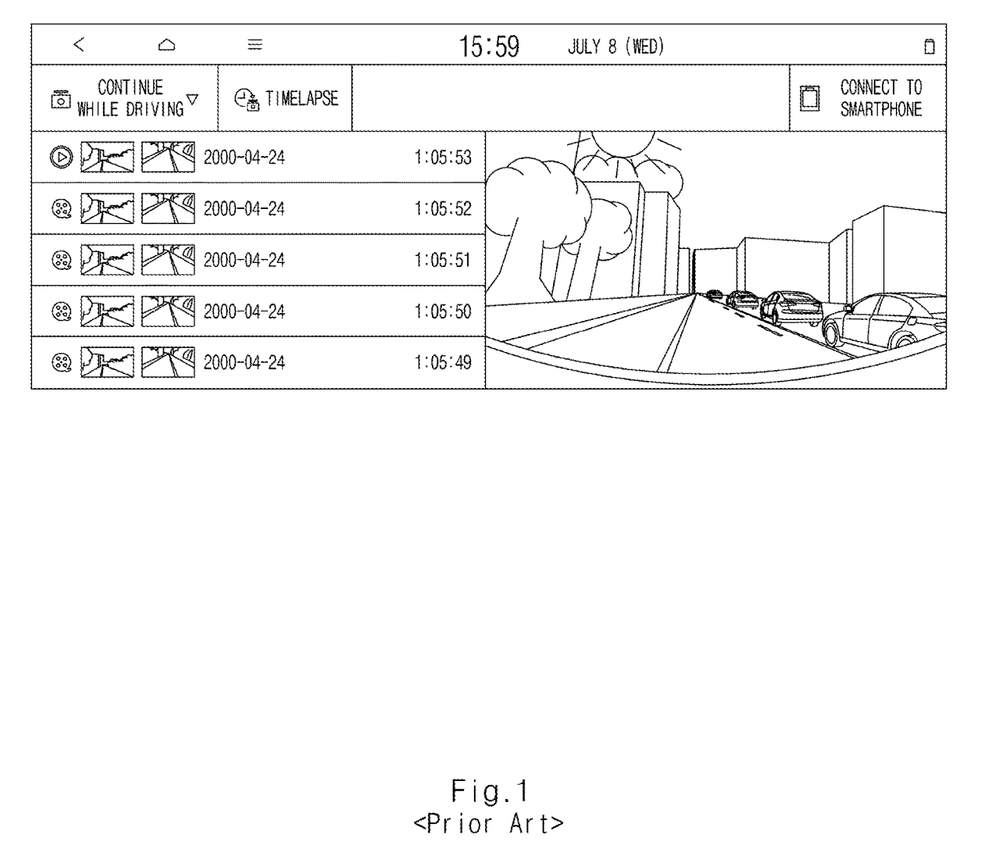
FIG. 1 is a drawing illustrating an example in which a conventional video record system displays a list of recorded videos.

A built-in drive video record system is a device which records and stores a video around a vehicle using a built-in cam, for example, a front view camera and a rear view camera, while driving or parking. The built-in drive video record system may identify or delete the recorded video in the vehicle using a display loaded into the vehicle. As shown in FIG. 1, a conventional built-in drive video record system may display a list of recorded videos sorted in order of time on a display and may select and play one image on the list depending on a drag input of a user. Thus, in an existing technology, because the user should infer and find a desired video by only using a thumbnail and time information, it is difficult to find the desired video, when a file video is large in size or when the user does not find the video immediately after the video is recorded.

The information disclosed in the Background section above is to aid in the understanding of the background of the present disclosure, and should not be taken as acknowledgement that this information forms any part of prior art.

SUMMARY

The present disclosure has been made to solve the above-mentioned problems occurring in the conventional video record system while advantages achieved by the conventional video record system are maintained intact.

An aspect of the present disclosure provides a video record system for providing a list of videos recorded by a built-in cam mounted on a vehicle and a playback progress degree based on location information, such that a user quickly and easily finds a desired video among the recorded videos and an operation thereof.

According to an aspect of the present disclosure, a video record system may include at least one camera and a controller connected with the at least one camera. The controller may record a video around a vehicle using the at least one camera, may record location information of the vehicle, when recording the video, and may provide a list of the recorded videos depending on a driving situation of the vehicle.

The controller may operate the at least one camera, when supplying power to the vehicle, and may store a video captured by the at least one camera depending on a predetermined recording scheme.

The controller may obtain the location information of the vehicle using a global positioning system (GPS) and may match the obtained location information of the vehicle to a file of the recorded video to record the location information of the vehicle.

The controller may determine whether there is a change in location of the vehicle and may determine a video list providing scheme depending on whether there is the change in location of the vehicle.

The controller may determine whether there is the change in location of the vehicle within a predetermined unit time or whether a vehicle speed is greater than 0 kph within the predetermined unit time to determine whether there is the change in location of the vehicle.

The controller may display a video list based on time information of the recorded video, when there is no change in location of the vehicle for more than the predetermined unit time or when the vehicle speed is kept 0 kph for more than the predetermined unit time.

The controller may display a video list based on location information of the recorded video, when there is the change in location of the vehicle within the predetermined unit time or when the vehicle speed is greater than 0 kph within the predetermined unit time.

The controller may display a movement path of the vehicle on map data based on the location information of the recorded video.

When a point is selected on the movement path, the controller may play and output a recorded video matched to location information of the selected point.

According to another aspect of the present disclosure, an operation method of a video record system may include recording a video around a vehicle using the at least one camera, recording location information of the vehicle, when recording the video, and providing a list of the recorded videos depending on a driving situation of the vehicle.

The recording of the video may include operating the at least one camera, when supplying power to the vehicle and storing a video captured by the at least one camera depending on a predetermined recording scheme.

The recording of the location information may include obtaining the location information using a global positioning system (GPS) and matching the location information to a file of the recorded video to record the location information.

The providing of the list of the recorded videos may include determining whether there is a change in location of the vehicle and determining a video list providing scheme depending on whether there is the change in location of the vehicle.

The determining of whether there is the change in location of the vehicle may include determining whether there is the change in location of the vehicle within a predetermined unit time or whether a vehicle speed is greater than 0 kph within the predetermined unit time.

The determining of the video list providing scheme may include displaying a video list based on time information of the recorded video, when there is no change in location of the vehicle for more than the predetermined unit time or when the vehicle speed is kept 0 kph for more than the predetermined unit time.

The determining of the video list providing scheme may include displaying a video list based on location information of the recorded video, when there is the change in location of the vehicle within the predetermined unit time or when the vehicle speed is greater than 0 kph within the predetermined unit time.

The determining of the video list providing scheme may further include displaying a movement path of the vehicle on map data based on the location information of the recorded video.

The determining of the video list providing scheme may further include, when a point is selected on the movement path, playing and outputting a video matched to location information of the selected point.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 2:
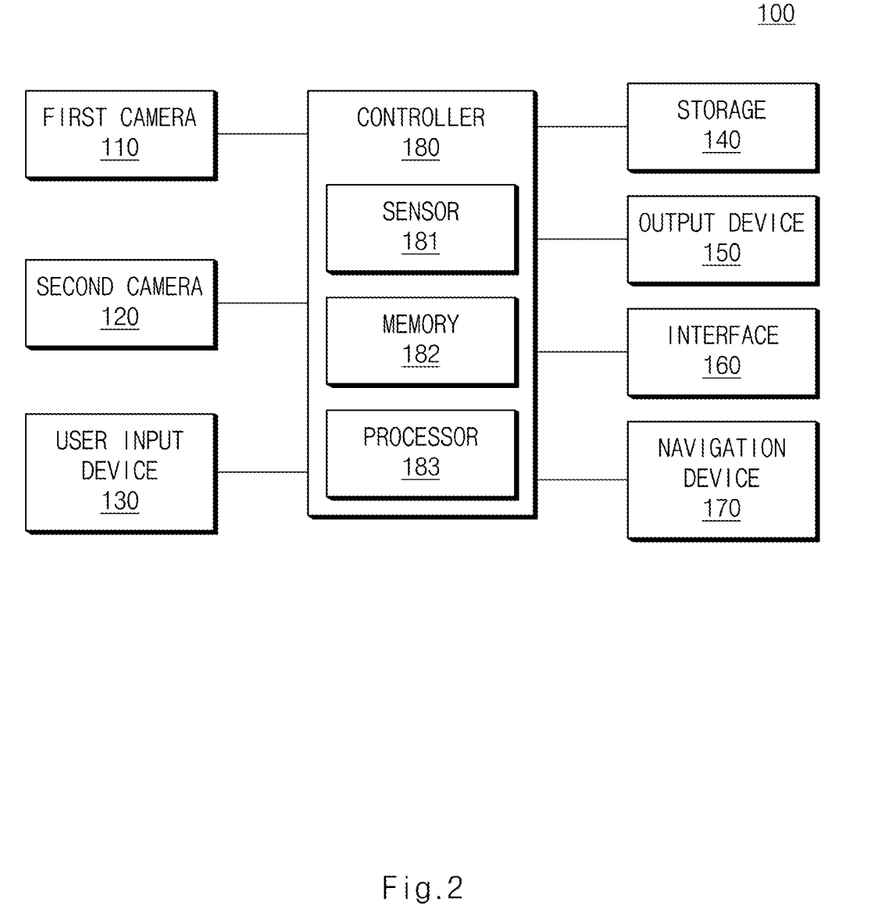
FIG. 2 is a block diagram illustrating a configuration of a video record system according to exemplary embodiments of the present disclosure.

FIG. 2 is a block diagram illustrating a configuration of a video record system according to exemplary embodiments of the present disclosure.

A video record system 100 may be embedded in a vehicle to continuously record and store a video around the vehicle while driving or parking, may record and store a video around the vehicle, when an event occurs while driving or parking, or may manually record and store a video around the vehicle while driving or parking. Referring to FIG. 1, the video record system 100 may include a first camera 110, a second camera 120, a user input device 130, a storage 140, an output device 150, an interface 160, a navigation device 170, a controller 180, and the like.

The first camera 110 and the second camera 120 may be a built-in cam embedded in the vehicle. The first camera 110 and the second camera 120 may be mounted on different locations of the vehicle to capture videos around the vehicle. For example, the first camera 110 may be installed in a front portion of the vehicle to capture a front-view video, and the second camera 120 may be installed in a rear portion of the vehicle to capture a rear-view video. It is disclosed that the two cameras 110 and 120 are installed in the vehicle in FIG. 2, but not limited thereto. Three or more cameras may be installed at different locations of the vehicle. For example, cameras may be installed in a front portion, a rear portion, and a side portion of the vehicle, respectively.

The user input device 130 may be a human interface device (HID) which generates data (a signal or information) according to manipulation of a user. For example, the user input device 130 may output a record start command, a record stop command, or the like depending on manipulation of a record switch. The user input device 130 may include a keyboard, a keypad, a button, a switch, a touch pad, a touch screen, and/or the like. The user input device 130 may be disposed in a steering wheel, a dashboard, a centerfacia, a door trim, and/or the like.

The storage 140 may store the video captured by the first camera 110 and/or the second camera 120. The storage 140 may include a non-volatile medium such as a flash memory, a hard disk, a solid state disk (SSD), a secure digital (SD) card, an embedded multimedia card (eMMC), and/or a universal flash storage (UFS).

The output device 150 may output visual information, audible information, and the like. The output device 150 may play and output a video. The output device 150 may include an audio video navigation (AVN) or an infotainment system terminal.

When the video record system 100 is connected with an external device, the interface 160 may be a path where various command signals for inputting data, for example, a recorded video or the like from the video record system 100 to the external device or for inputting data, for example, a recorded video or the like from the external device are delivered to the video record system 100. Herein, the external device may be a universal serial bus (USB) memory, a smartphone, or the like. The interface 160 may transmit and receive data with the external device through a cable, a wireless-fidelity (Wi-Fi) dongle, or the like. The interface 160 may be a wired/wireless data port, a memory card port, and/or the like.

The navigation device 170 may navigate a driving route to a predetermined destination and may guide a driver along the driving route. The navigation device 170 may measure a current location of the vehicle and may provide the controller 180 with the measured current location. Although not illustrated in the drawing, the navigation device 170 may include a memory for storing map data, a global positioning system (GPS) receiver for measuring a vehicle location, a communication circuit for receiving traffic information from the outside, an output device (e.g., a display, a speaker, and the like) for outputting route guidance, a processor for navigating a driving route and guiding a driver along the navigated driving route, and/or the like.

The controller 180 may record videos captured by the first camera 110 and the second camera 120 continuously or when an event occurs while driving or parking or may record the videos captured by the first camera 110 and the second camera 120 depending on a manual command of a user. The controller 180 may include a sensor 181, a memory 182, and a processor 183. The controller 180 may be implemented in the form of a system on chip (SoC).

The sensor 181 may sense an impact occurring on the vehicle. The sensor 181 may measure an impact value (or the amount of impact), when an impact occurs on the vehicle. The sensor 181 may deliver the measured impact value (or the sensing value) to the processor 183. The sensor 181 may be implemented as an acceleration sensor (or a gravity (G) sensor) which measures acceleration generated by an impact, vibration, and/or the like.

The memory 182 may store setting information, such as a recording scheme, a video playback scheme, a playback list display scheme, and/or the like, which are/is previously set by the user (e.g., a driver). The recording scheme may be divided into continuous recording while driving, event recording while driving, continuous recording while parking, event recording while parking, and/or the like. The event recording while driving and the event recording while parking may be a scheme which records a video when an event, such as impact detection, occurs. Furthermore, the memory 182 may store a video captured (obtained) by the first camera 110 and/or the second camera 120. The memory 182 may be a non-transitory storage medium which stores instructions executed by the processor 183. The memory 182 may be implemented as at least one of storage media such as a random access memory (RAM), a static RAM (SRAM), a read only memory (ROM), a programmable ROM (PROM), an electrically erasable and programmable ROM (EEPROM), an erasable and programmable ROM (EPROM), and a register.

The processor 183 may control the overall operation of the controller 180. The processor 183 may be implemented as at least one of processing devices such as an application specific integrated circuit (ASIC), a digital signal processor (DSP), programmable logic devices (PLD), field programmable gate arrays (FPGAs), a central processing unit (CPU), microcontrollers, and/or microprocessors.

When a vehicle power is supplied, the processor 183 may start to record a video using the first camera 110 and/or the second camera 120 based on a predetermined recording scheme. For example, when the continuous recording is set, the processor 183 may operate the first camera 110 and/or the second camera 120 to record a video around the vehicle, when accessory power is supplied. When the event recording is set, the processor 183 may record a video around the vehicle using the first camera 110 and/or the second camera 120, when detecting an impact by means of the sensor 181 while driving or parking.

The processor 183 may record (store) a video captured by means of the first camera 110 and/or the second camera 120 in the storage medium 140 and/or 182. In other words, the processor 183 may record a video around the vehicle using the first camera 110 and/or the second camera 120. The processor 183 may store a video obtained by the first camera 110 and/or the second camera 120 in the storage 140 based on a predetermined format. Information, such as a date and time of recording, a date and time of change, a time scale, a refresh time, a refresh rate, a refresh volume, and/or horizontal and vertical resolution, may be included in a video file (a video format) stored in the storage 140.

Furthermore, the processor 183 may store (record) location information of the vehicle together when storing (recording) the video. The processor 183 may receive the location information of the vehicle from the navigation device 170, when recording the video, and may record the location information of the vehicle in the recorded video. In other words, the processor 183 may add the location information of the vehicle at a time when capturing the video to a video file. Obtaining the location information of the vehicle by means of the navigation device 170 is described as an example in the present embodiment, but not limited thereto. For example, the processor 183 may be implemented to obtain location information of the vehicle using a separate GPS receiver.

The processor 183 may determine a scheme which displays a list (playlist) of recorded videos, that is, a video list providing scheme, depending on a driving situation of the vehicle (a change in location of the vehicle). Herein, the video list providing scheme may be classified as a time-based video list providing scheme and a location-based video list providing scheme. The processor 183 may output a list of the recorded videos on a displayed screen of the output device 150 depending on the determined video list providing scheme.

In detail, the processor 183 may determine whether a change in location of the vehicle is detected. When vehicle locations are the same as each other or the vehicle speed is kept 0 kph, during a default unit time when a continuous video is recorded, the processor 183 may determine that there is no change in location of the vehicle. The processor 183 may obtain vehicle speed information by means of a vehicle speed sensor or another electronic control unit (ECU). The default unit time may be set in advance by a system designer.

When there is no change in location of the vehicle, the processor 183 may determine the video list providing scheme as the time-based video list providing scheme. When the vehicle locations are the same as each other or the vehicle is in a stopped state where the vehicle speed is 0 kph, during the default unit time, the processor 183 may sort the recorded videos in order of time to provide a playlist. When providing the playlist, the processor 183 may display a vehicle location on a map and may display a thumbnail of the recorded video. The processor 183 may display a vehicle location, that is, a video capture location, at a time when the selected video is captured, on the map. Furthermore, when one video is selected on the playlist, the processor 183 may play and output the video by means of the output device 150.

When there is no change in location of the vehicle, the processor 183 may determine the video list providing scheme as the location-based video list providing scheme. The processor 183 may sort the recorded videos based on location information to provide a playlist. The processor 183 may display a movement path where the vehicle travels on the map. The processor 183 may play and display a video corresponding to a specific point on the movement path.

Figure 3:
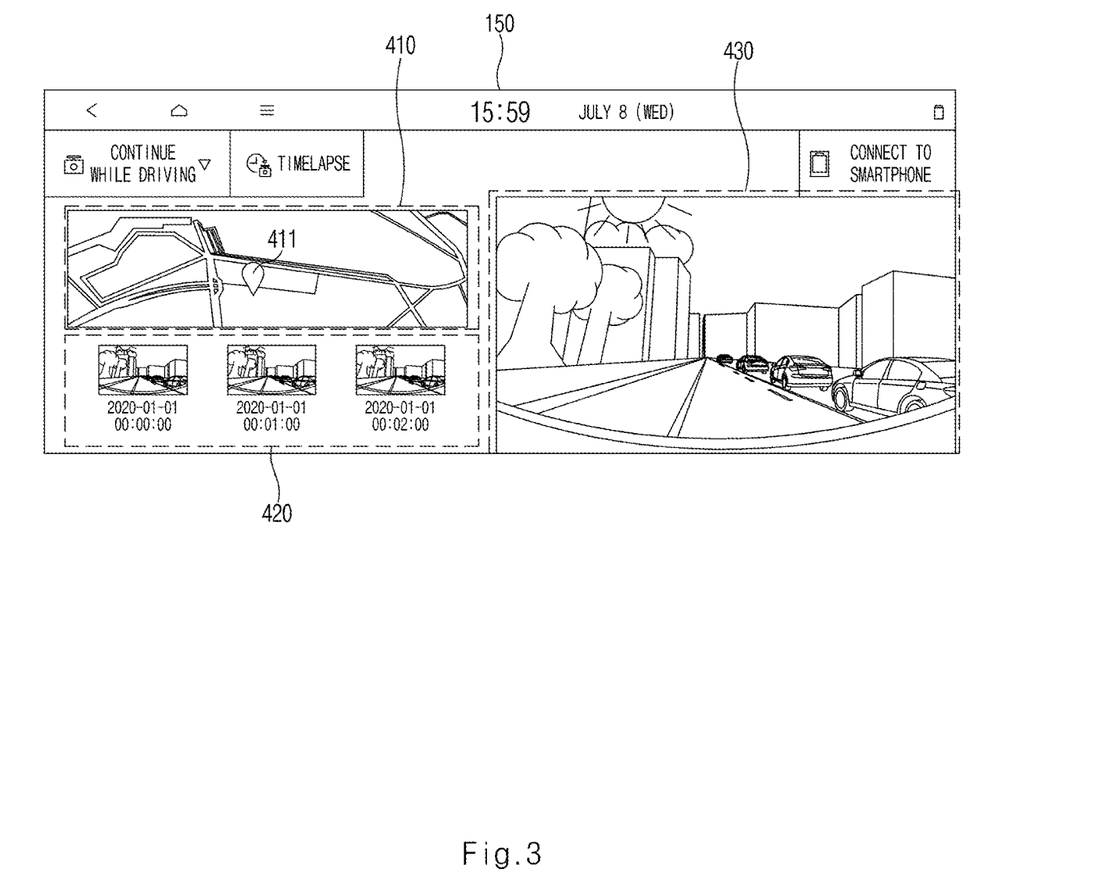
FIG. 3 is a drawing illustrating an example of providing a video list according to exemplary embodiments of the present disclosure.

FIG. 3 is a drawing illustrating an example of providing a video list according to exemplary embodiments of the present disclosure.

When vehicle locations are the same as each other or the vehicle speed is kept 0 kph, for more than a default unit time (e.g., one minute) when a continuous video is recorded, in a state where accessory power is supplied to a vehicle, a controller 180 of FIG. 2 may provide a video file list based on time information of a recorded video. Until the supplying of the accessory power is stopped from a time when the accessory power is supplied to the vehicle, the controller 180 may proceed with continuous video recording using at least one of a first camera 110 or a second camera 120. When the operation of the vehicle ends, the controller 180 may display a movement path on map data. The controller 180 may allow a user to identify a video recorded along the movement path.

When the operation of the vehicle ends, as shown in FIG. 3, the controller 180 may divide a displayed screen of an output device 150 of FIG. 2 into a plurality of regions 410, 420, and 430. The first region 410 may display map data. When the operation of the vehicle ends, the controller 180 may display a movement path of the vehicle on the map data of the first region 410. At this time, the controller 180 may display a current location of the vehicle using a separate icon 411. When the icon 411 is clicked, the controller 180 may display a video file list (a video list) on the second region 420 on the basis of time information. When displaying the video file list, the controller 180 may display a thumbnail of the recorded video together. When one item, that is, a video file is selected on the video file list displayed on the second region 420, the controller 180 may play and output (display) the video file on the third region 430. The controller 180 may display a vehicle location at a time when the video output on the third region 430 is captured on the first region 410. In other words, the controller 180 may display a video recording location on the map data of the first region 410 based on a location information recorded in the played video.

Figure 4:
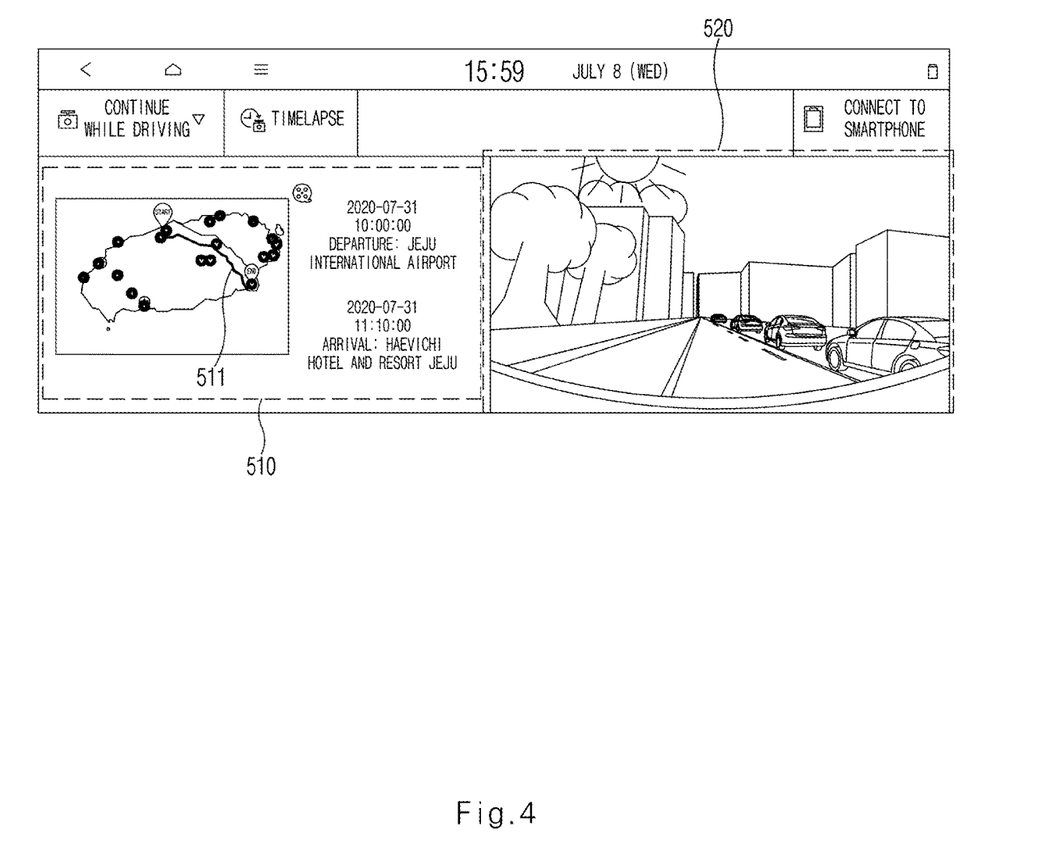
FIG. 4 is a drawing illustrating another example of providing a video list according to exemplary embodiments of the present disclosure.

FIG. 4 is a drawing illustrating another example of providing a video list according to exemplary embodiments of the present disclosure.

When a vehicle location is changed or the vehicle speed is greater than 0 kph, in a default unit time (e.g., one minute) when a continuous video is recorded, in a state where accessory power is supplied to a vehicle, a controller 180 of FIG. 2 may match location information of a recorded image to map data to display a driving route.

When a record video confirmation menu is selected by a user (e.g., a driver), the controller 180 may enter the selected record video confirmation menu to display a list of all files as shown in FIG. 4. Referring to FIG. 4, a controller 180 of FIG. 2 may divide a displayed screen of an output device 150 of FIG. 2 into a fourth region 510 and a fifth region 520. The controller 180 may display the displayed screen on map data where vehicle locations at times when recorded videos are captured, that is, a movement path where the vehicle travels is displayed on the fourth region 510. When one point on the movement path is selected, the controller 180 may play a recorded video matched to location information of the selected point and may display the played video on the fifth region 520. A movement path line 511 displayed on the fourth region 510 may be used as a progress indicator indicating a playback progress degree. When the user performs touch and drag along the movement path line 511, the controller 180 may play a video recorded at a location corresponding to the changed touch point and may output the played video on the fifth region 520.

Figure 5:
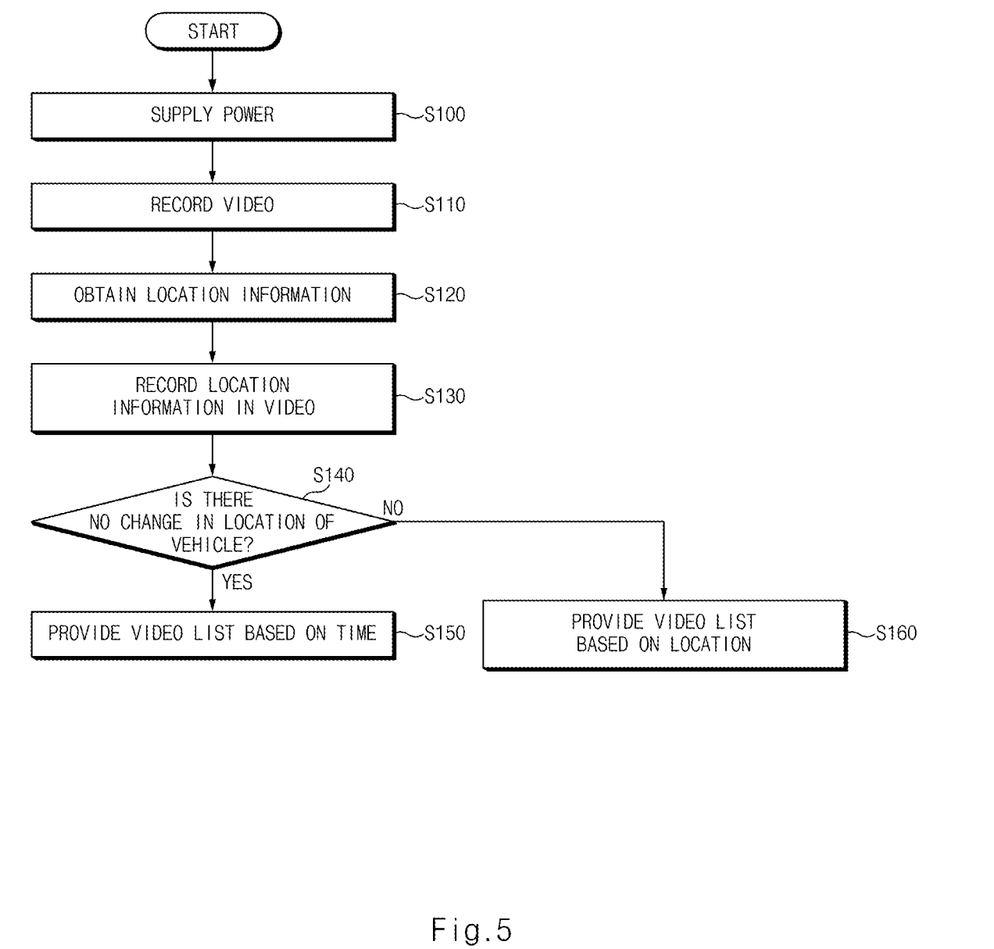
FIG. 5 is a flowchart illustrating an operation method of a video record system according to exemplary embodiments of the present disclosure.

FIG. 5 is a flowchart illustrating an operation method of a video record system according to exemplary embodiments of the present disclosure.

In S100, a controller 180 of FIG. 2 may recognize that power is supplied to a vehicle. When accessory power is supplied to the vehicle, the controller 180 may operate a first camera 110 and a second camera 120 of FIG. 2.

In S110, the controller 180 may record a video using at least one of the first camera 110 or the second camera 120. The controller 180 may initiate video recording depending on a predetermined recording scheme. For example, when continuous recording is set, the controller 180 may immediately initiate video recording, when the first camera 110 and/or the second camera 120 are/is operated when power is supplied to the vehicle.

When recording the video, in S120, the controller 180 may obtain location information of the vehicle. The controller 180 may receive the location information of the vehicle from a navigation device 170 of FIG. 2.

In S130, the controller 180 may record the location information in the recorded video. The controller 180 may match and store the recorded video to the location information of the vehicle at a time when the video is recorded.

In S140, the controller 180 may identify whether there is no change in location of the vehicle. The controller 180 may determine whether there is no change in location of the vehicle within a predetermined unit time (e.g., one minute) or whether the vehicle speed is 0 kph within the predetermined unit time (e.g., one minute).

When there is no change in location of the vehicle, in S150, the controller 180 may provide a video list based on time information. The controller 180 may sort recorded videos in a time when the videos are recorded to display a file list of the recorded videos.

When there is a change in location of the vehicle, in S160, the controller 180 may provide a video list based on location information. The controller 180 may display a file list of a map format using location information where the video is recorded.

Figure 6:
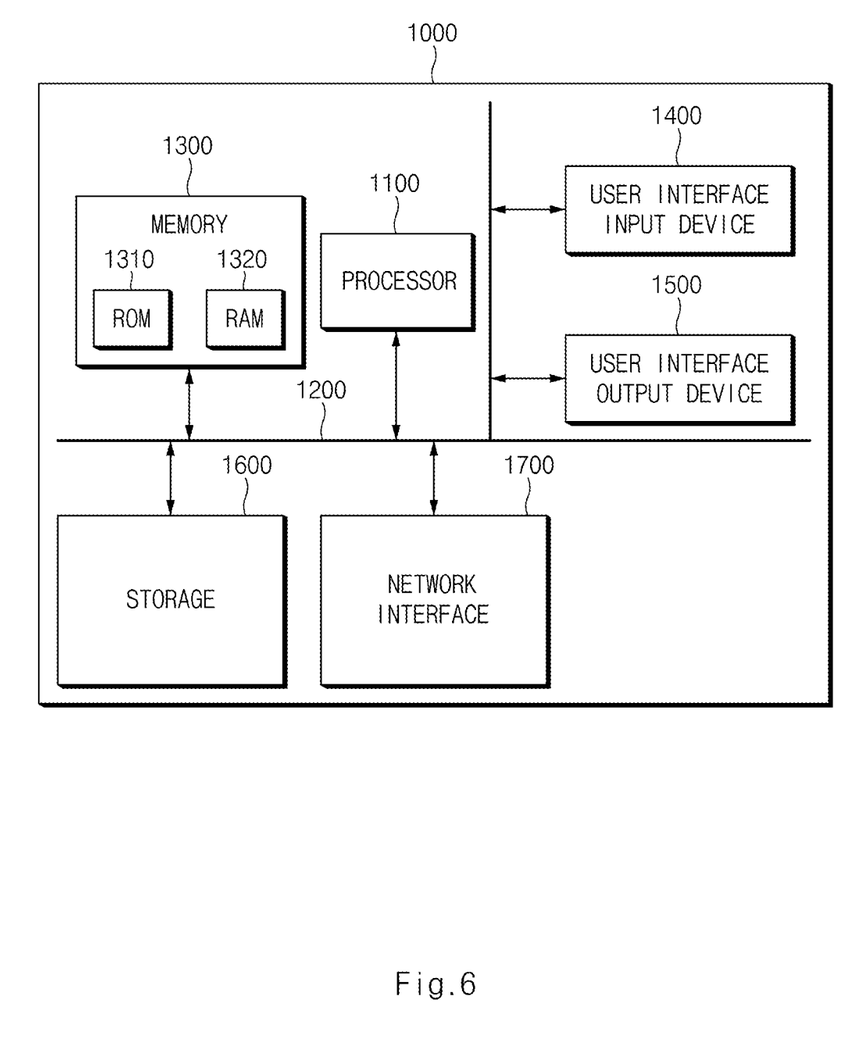
FIG. 6 is a block diagram illustrating a computing system for executing an operation method of a video record system according to exemplary embodiments of the present disclosure.

FIG. 6 is a block diagram illustrating a computing system for executing an operation method of a video record system according to exemplary embodiments of the present disclosure.

Referring to FIG. 6, a computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a read only memory (ROM) 1310 and a random access memory (RAM) 1320.

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, and a CD-ROM. The exemplary storage medium may be coupled to the processor, and the processor may read information out of the storage medium and may record information in the storage medium. Alternatively, the storage medium may be integrated with the processor 1100. The processor 1100 and the storage medium may reside in an application specific integrated circuit (ASIC). The ASIC may reside within a user terminal. In another case, the processor 1100 and the storage medium may reside in the user terminal as separate components.

According to exemplary embodiments of the present disclosure, the video record system may provide a list of videos recorded by a built-in cam mounted on the vehicle and a playback progress degree based on location information, such that the user may quickly and easily find a desired video.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims. Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. A video record system, comprising:
   at least one camera; and
   a controller connected with the at least one camera,
   wherein the controller is configured to:
   record a video around a vehicle using the at least one camera;
   record location information of the vehicle when recording the video;
   determine a video list providing scheme among different video list providing schemes for displaying a list of recorded videos depending on whether there is a change in location of the vehicle; and
   provide the list of the recorded videos depending on the determined video list providing scheme.

2. The video record system of claim 1, wherein the controller operates the at least one camera when supplying power to the vehicle, and stores a video captured by the at least one camera depending on a predetermined recording scheme.

3. The video record system of claim 1, wherein the controller obtains the location information of the vehicle using a global positioning system (GPS) and matches the obtained location information of the vehicle to a file of the recorded video to record the location information of the vehicle.

4. The video record system of claim 1, wherein the controller determines whether there is the change in location of the vehicle within a predetermined unit time or whether a vehicle speed is greater than 0 kph within the predetermined unit time to determine whether there is the change in location of the vehicle.

5. The video record system of claim 4, wherein the controller displays a video list based on time information of the recorded video, when there is no change in location of the vehicle for more than the predetermined unit time or when the vehicle speed is kept 0 kph for more than the predetermined unit time.

6. The video record system of claim 4, wherein the controller displays a video list based on location information of the recorded video, when there is the change in location of the vehicle within the predetermined unit time or when the vehicle speed is greater than 0 kph within the predetermined unit time.

7. The video record system of claim 6, wherein the controller displays a movement path of the vehicle on map data based on the location information of the recorded video.

8. The video record system of claim 7, wherein when a point is selected on the movement path, the controller plays and outputs a recorded video matched to location information of the selected point.

9. An operation method of a video record system, the operation method comprising:
   recording, by a controller, a video around a vehicle using at least one camera;
   recording, by the controller, location information of the vehicle when recording the video;
   determining, by the controller, a video list providing scheme among different video list providing schemes for displaying a list of recorded videos depending on whether there is a change in location of the vehicle; and
   providing, by the controller, the list of the recorded videos depending on the determined video list providing scheme.

10. The operation method of claim 9, wherein the recording of the video includes:
    operating, by the controller, the at least one camera when supplying power to the vehicle; and
    storing, by the controller, a video captured by the at least one camera depending on a predetermined recording scheme.

11. The operation method of claim 9, wherein the recording of the location information includes:
    obtaining, by the controller, the location information using a global positioning system (GPS); and
    matching, by the controller, the location information to a file of the recorded video to record the location information.

12. The operation method of claim 9, wherein the determining of whether there is the change in location of the vehicle includes:
    determining, by the controller, whether there is the change in location of the vehicle within a predetermined unit time or whether a vehicle speed is greater than 0 kph within the predetermined unit time.

13. The operation method of claim 12, wherein the determining of the video list providing scheme includes:
    displaying, by the controller, a video list based on time information of the recorded video, when there is no change in location of the vehicle for more than the predetermined unit time or when the vehicle speed is kept 0 kph for more than the predetermined unit time.

14. The operation method of claim 13, wherein the determining of the video list providing scheme includes:
    displaying, by the controller, a video list based on location information of the recorded video, when there is the change in location of the vehicle within the predetermined unit time or when the vehicle speed is greater than 0 kph within the predetermined unit time.

15. The operation method of claim 14, wherein the determining of the video list providing scheme further includes:
    displaying, by the controller, a movement path of the vehicle on map data based on the location information of the recorded video.

16. The operation method of claim 15, wherein the determining of the video list providing scheme further includes:
    when a point is selected on the movement path, playing and outputting, by the controller, a video matched to location information of the selected point.

* * * * *